(12) United States Patent
Matsuno et al.

(10) Patent No.: US 11,474,342 B2
(45) Date of Patent: Oct. 18, 2022

(54) WAVELENGTH-TUNABLE INTERFERENCE FILTER

(71) Applicant: Seiko Epson Corporation, Tokyo (JP)

(72) Inventors: Yasushi Matsuno, Matsumoto (JP); Tomoaki Nakamura, Shiojiri (JP)

(73) Assignee: SEIKO EPSON CORPORATION

( * ) Notice: Subject to any disclaimer, the term of this patent is extended or adjusted under 35 U.S.C. 154(b) by 300 days.

(21) Appl. No.: 16/905,962

(22) Filed: Jun. 19, 2020

(65) Prior Publication Data

US 2020/0400938 A1   Dec. 24, 2020

(30) Foreign Application Priority Data

Jun. 21, 2019   (JP) .............................. JP2019-115308

(51) Int. Cl.
  *G02B 26/00* (2006.01)
  *G02B 5/00* (2006.01)
(52) U.S. Cl.
  CPC ........... *G02B 26/001* (2013.01); *G02B 5/005* (2013.01)
(58) Field of Classification Search
  CPC .. G02B 6/29395; G02B 6/0026; G02B 26/06; G02B 5/28; G02B 6/29346
  See application file for complete search history.

(56) References Cited

U.S. PATENT DOCUMENTS

| 8,149,489 B2 * | 4/2012 | Shimokawa ............ B81B 3/004 |
| | | 359/198.1 |
| 9,134,470 B2 | 9/2015 | Sano |
| 2004/0027671 A1 * | 2/2004 | Wu .......................... G01J 3/26 |
| | | 359/578 |
| 2010/0142067 A1 * | 6/2010 | Hanamura ............. G02B 5/284 |
| | | 359/850 |

(Continued)

FOREIGN PATENT DOCUMENTS

| CN | 102207615 A | 10/2011 |
| JP | 2010-008644 A | 1/2010 |

(Continued)

*Primary Examiner* — William J Carter
(74) *Attorney, Agent, or Firm* — Harness, Dickey & Pierce, P.L.C.

(57) ABSTRACT

A wavelength-tunable interference filter includes: a first substrate where a first mirror and a first electrode are provided; a second substrate where a second mirror corresponding to the first mirror and a second electrode facing the first electrode are provided; and a bonding part bonding the first substrate and the second substrate together. The first substrate includes a moving part where the first mirror is arranged, a diaphragm part holding the moving part in such a way that the moving part is movable in the Z-direction, and an outer circumferential part provided outside of the diaphragm part. The diaphragm part includes a planar part having a uniform thickness, and a first slope part having a thickness in the Z-direction incrementing as it goes from the planar part toward the outer circumferential part. The first electrode is provided over a range from the planar part to the (Continued)

first slope part. An outer edge of the first electrode, which is an edge opposite to the first mirror, is located at the first slope part. The bonding part is provided over a range from a part of the first slope part to the outer circumferential part.

7 Claims, 11 Drawing Sheets

(56) References Cited

U.S. PATENT DOCUMENTS

| | | | |
|---|---|---|---|
| 2011/0222157 A1* | 9/2011 | Sano | G01J 3/26 359/578 |
| 2011/0222158 A1* | 9/2011 | Sano | G02B 5/26 359/584 |
| 2011/0228396 A1 | 9/2011 | Shinto et al. | |
| 2013/0044377 A1 | 2/2013 | Nishimura et al. | |
| 2013/0083399 A1 | 4/2013 | Hirokubo et al. | |
| 2015/0070768 A1 | 3/2015 | Sano | |
| 2015/0346407 A1 | 12/2015 | Sano | |

FOREIGN PATENT DOCUMENTS

| | | |
|---|---|---|
| JP | 2011-191554 A | 9/2011 |
| JP | 2011-197386 A | 10/2011 |
| JP | 2012-168362 A | 9/2012 |
| JP | 2019-015865 A | 1/2019 |
| JP | 2019-045599 A | 3/2019 |

* cited by examiner

WAVELENGTH-TUNABLE INTERFERENCE FILTER

The present application is based on, and claims priority from JP Application Serial Number 2019-115308, filed Jun. 21, 2019, the disclosure of which is hereby incorporated by reference herein in its entirety.

BACKGROUND

1. Technical Field

The present disclosure relates to a wavelength-tunable interference filter.

2. Related Art

According to the related art, a wavelength-tunable interference filter (optical filter) having a pair of mirrors arranged facing each other via an air gap is known. JP-A-2010-008644 is an example of the related art.

The wavelength-tunable interference filter described in JP-A-2010-008644 is an air gap-type electrostatically driven etalon element in which one of a pair of mirrors is arranged at a first substrate and in which the other of the pair of mirrors is arranged at a second substrate. The first substrate in this wavelength-tunable interference filter has a circular ring-shaped groove formed on a surface opposite to a surface facing the second substrate. Thus, a site with a reduced thickness of the second substrate serves as an elastic deformable diaphragm. A site surrounded by the diaphragm serves as a moving part where the mirror is arranged and this site can move toward and away from the first substrate.

An electrode forming an electrostatic actuator for changing the gap is provided at each of the first substrate and the second substrate. These electrodes are arranged facing each other. The electrode arranged at the first substrate is arranged over a range from a part of the moving part and the diaphragm to outside of the diaphragm. The electrode covering the range from a part of the moving part to outside of the diaphragm faces the electrode arranged at the second substrate, via a second gap.

However, the wavelength-tunable interference filter described in JP-A-2010-008644 has a large planar size due to the electrode provided over the range covering from the moving part to outside of the diaphragm. Narrowing a bonding area between the first substrate and the second substrate can reduce the planar size. However, narrowing the bonding area may reduce the substrate bonding strength between the first substrate and the second substrate and may cause the separation of the first substrate and the second substrate from each other, resulting in lower reliability of the wavelength-tunable interference filter.

SUMMARY

A wavelength-tunable interference filter according to an aspect of the present disclosure includes: a first substrate; a second substrate facing the first substrate; a first mirror provided at the first substrate; a second mirror provided at the second substrate and facing the first mirror via a first gap; a first electrode provided at the first substrate; a second electrode provided at the second substrate and facing the first electrode via a second gap; and a bonding part bonding the first substrate and the second substrate together. The first substrate includes: a moving part where the first mirror is arranged, as viewed in a plan view taken from a Z-direction heading from the first substrate toward the second substrate; a diaphragm part surrounding the moving part and holding the moving part in such a way that the moving part is movable in the Z-direction; and an outer circumferential part provided outside of the diaphragm part and having a larger thickness in the Z-direction than the diaphragm part. The diaphragm part includes: a planar part having a uniform thickness, as viewed in a cross-sectional view sliced along a plane parallel to the Z-direction; and a first slope part arranged between the planar part and the outer circumferential part and having a thickness in the Z-direction incrementing as it goes from the planar part toward the outer circumferential part. The first electrode is provided at least over a range from the planar part to the first slope part, of a surface of the first substrate facing the second substrate, and an outer edge of the first electrode, which is an edge opposite to the first mirror, is located at the first slope part. The bonding part is provided over a range from a part of the first slope part to the outer circumferential part.

In the wavelength-tunable interference filter, the first electrode may be formed of an inner electrode arranged outside of the first mirror and an outer electrode arranged outside of the inner electrode.

In the wavelength-tunable interference filter, a gap between the inner electrode and the outer electrode may have a distance of 0.2 mm or shorter.

In the wavelength-tunable interference filter, a gap between the outer edge and a bonding edge, which is an edge of the bonding part near the first mirror, may have a distance of 0.2 mm or shorter.

In the wavelength-tunable interference filter, the thickness in the Z-direction of the first slope part, where the outer edge is located, may be five times the thickness of the planar part or more.

In the wavelength-tunable interference filter, the diaphragm part may further include a second slope part provided between the planar part and the moving part and having a thickness in the Z-direction incrementing as it goes from the planar part toward the moving part. An inner edge of the first electrode, which is an edge near the first mirror, may be located at the second slope part.

In the wavelength-tunable interference filter, the thickness of the second slope part, where the inner edge is located, may be five times the thickness of the planar part or more.

DESCRIPTION OF EXEMPLARY EMBODIMENTS

First Embodiment

A first embodiment will now be described.

Figure 1:
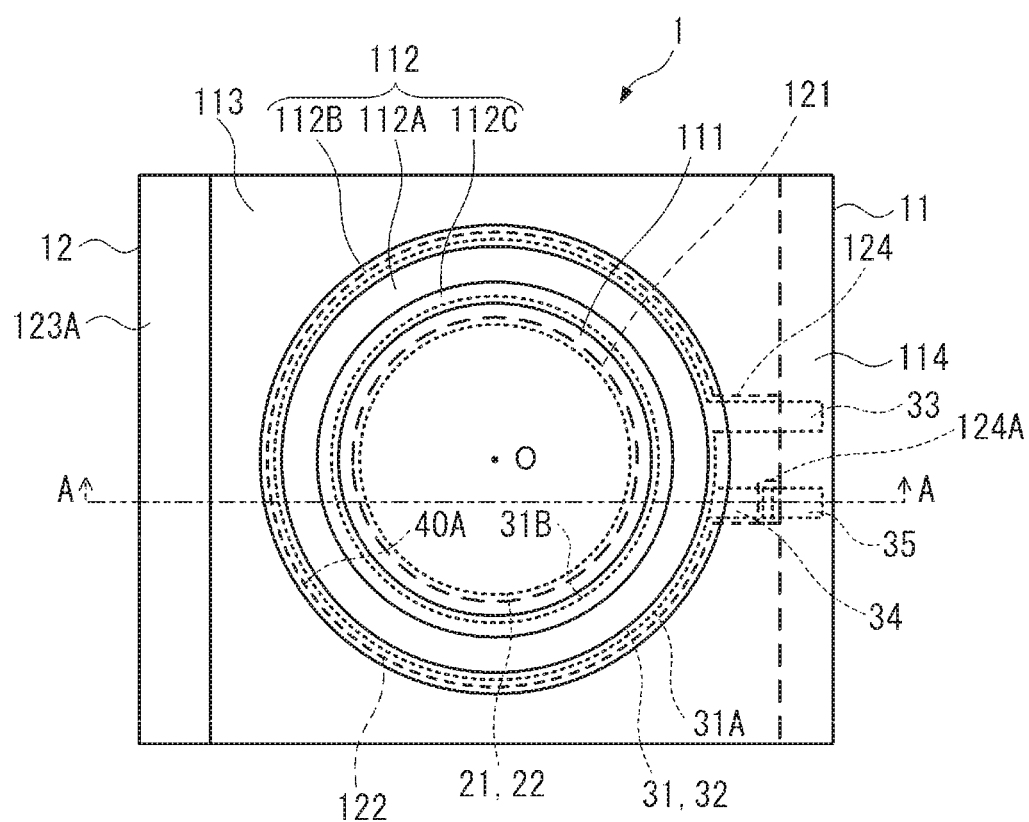
FIG. 1 is a plan view showing a schematic configuration of a wavelength-tunable interference filter according to a first embodiment.
Figure 2:
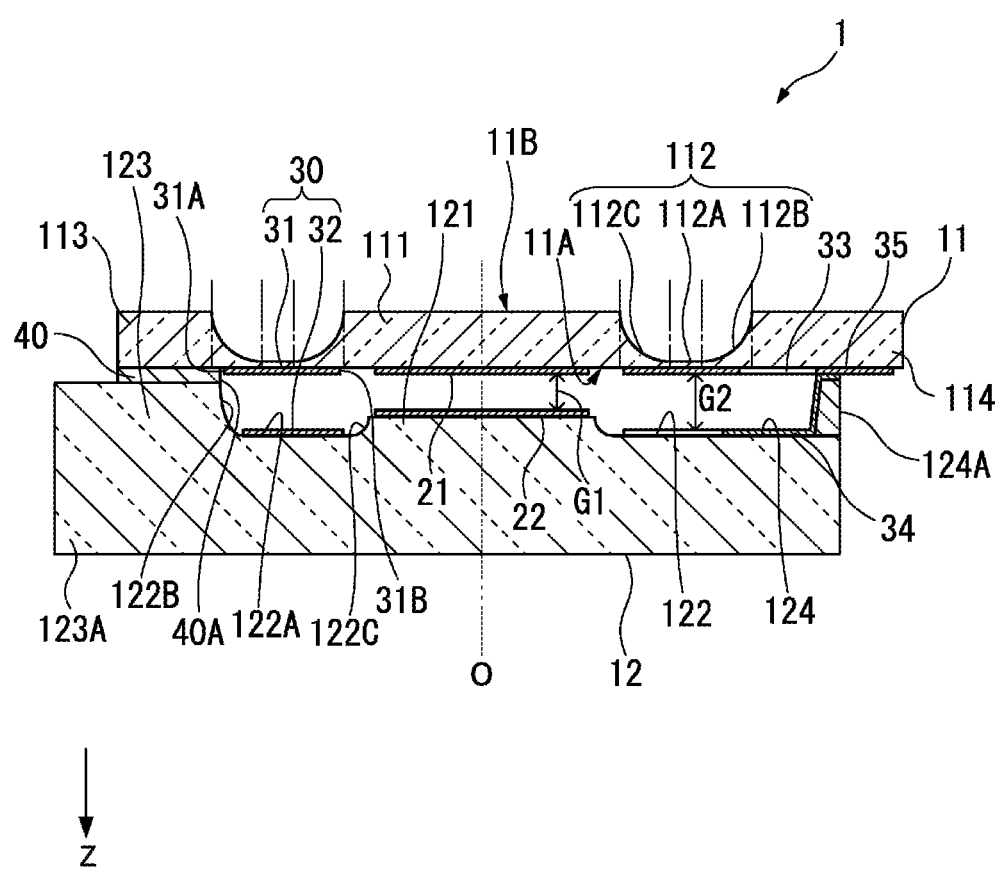
FIG. 2 is a cross-sectional view of the wavelength-tunable interference filter taken along A-A in FIG. 1.

FIG. 1 is a plan view showing a schematic configuration of a wavelength-tunable interference filter 1 according to this embodiment. FIG. 2 is a cross-sectional view of the wavelength-tunable interference filter 1 taken along A-A in FIG. 1.

As shown in FIGS. 1 and 2, the wavelength-tunable interference filter 1 has a light-transmissive first substrate 11, a light-transmissive second substrate 12, a first mirror 21 provided at the first substrate 11, and a second mirror 22 provided at the second substrate 12. The first substrate 11 and the second substrate 12 are substrates holding the first mirror 21 and the second mirror 22 in such a way that these mirrors face each other via a first gap G1. The wavelength-tunable interference filter 1 is a Fabry-Perot etalon element which emits light having a predetermined wavelength corresponding to the dimension of the first gap G1, of the light incident on the first mirror 21 and the second mirror 22.

The wavelength-tunable interference filter 1 also has a first electrode 31 provided at the first substrate 11, and a second electrode 32 provided at the second substrate 12. The first electrode 31 and the second electrode 32 are arranged facing each other via a second gap G2 and form an electrostatic actuator 30. When a voltage is applied between the first electrode 31 and the second electrode 32, an electrostatic attraction acts between the first electrode 31 and the second electrode 32. This causes a change in the dimension of the second gap G2 and a change in the first gap G1 accordingly. Thus, the wavelength of the light emitted from the wavelength-tunable interference filter 1 changes according to the dimension of the first gap G1.

The configuration of the wavelength-tunable interference filter 1 will now be described in detail.

In the description below, the center points of the first mirror 21 and the second mirror 22 coincide with each other, as viewed in a plan view as shown in FIG. 1. The center axis of the mirrors passing through these center points is referred to as a filter center axis O. The filter center axis O is an axis parallel to a Z-direction heading from the first substrate 11 toward the second substrate 12.

Configurations of First Substrate 11 and Second Substrate 12

As shown in FIG. 1, the first substrate 11 has a moving part 111, a diaphragm part 112, an outer circumferential part 113, and a connector part 114, as viewed in a plan view taken from a direction heading from the first substrate 11 toward the second substrate 12 (the Z-direction).

More specifically, the first substrate 11 has a first surface 11A facing the second substrate 12, and a second surface 11B opposite to the first surface 11A. The second surface 11B is etched and thus has a recess, that is, the diaphragm part 112, formed thereon. The diaphragm part 112 is formed in a ring-like shape surrounding the moving part 111 as viewed in a plan view, and preferably formed in a circular ring-like shape, as shown in FIG. 1.

In this embodiment, a resist pattern is formed on the surface of the first substrate 11 while the parts other than the position to form the diaphragm part 112 is masked. Then, the diaphragm part 112 is formed by wet etching (isotropic etching). Therefore, in this embodiment, the diaphragm part 112 has a planar part 112A corresponding to a mask opening position, and a first slope part 112B and a second slope part 112C formed by over-etching around the planar part 112A.

The planar part 112A is a site having a uniform thickness in the Z-direction.

The first slope part 112B is a site formed between the planar part 112A and the outer circumferential part 113 and having a thickness in the Z-direction incrementing as it goes from the planar part 112A toward the outer circumferential part 113.

The second slope part 112C is a site formed between the planar part 112A and the moving part 111 and having a thickness in the Z-direction incrementing as it goes from the planar part 112A toward the moving part 111.

In this embodiment, the first slope part 112B and the second slope part 112C have a concavely curved circular arc-like surface due to the isotropic etching.

In this embodiment, the first electrode 31 is arranged at the first surface 11A facing the second substrate 12, of the diaphragm part 112. The arrangement of the first electrode 31 will be described later.

The moving part 111 is a site surrounded by the ring-shaped diaphragm part 112 and has a greater thickness in the Z-direction than the diaphragm part 112. The first mirror 21 is arranged at the first surface 11A of the moving part 111.

In this embodiment, the moving part 111 is held by the diaphragm part 112 in such a way as to be movable in the Z-direction. That is, when the electrostatic actuator 30 causes an electrostatic attraction to act between the first substrate 11 and the second substrate 12, the diaphragm part 112 flexes largely and the moving part 111 is displaced toward the second substrate 12. The moving part 111 has a greater thickness than the diaphragm part 112. Therefore, even when the diaphragm part 112 flexes largely, the flexure of the moving part 111 is restrained and the flexure of the first mirror 21 provided at the moving part 111 is restrained as well.

The outer circumferential part 113 is a site formed outside of the ring-shaped diaphragm part 112 and has a greater thickness in the Z-direction than the diaphragm part 112.

The outer circumferential part 113 is a site bonded to the second substrate 12 via a bonding part 40. The outer circumferential part 113 is formed to have an area equal to or greater than a preset prescribed value, as viewed in a plan view, in order to maintain the bonding strength between the first substrate 11 and the second substrate 12 at a predetermined level or higher.

As will be described in detail later, at a part of the outer circumferential part 113 near the connector part 114, a first coupling electrode 33 coupled to the first electrode 31 is arranged over a range from the diaphragm part 112 to the connector part 114. A third coupling electrode 35 is provided over a range from the connector part 114 to a part of the outer circumferential part 113. The third coupling electrode 35 is electrically coupled to a second coupling electrode provided at the second substrate 12. The bonding part 40 may not be provided at the position where the first coupling electrode 33 and the third coupling electrode 35 are arranged or within a predetermined distance around the position where the first coupling electrode 33 and the third coupling electrode 35 are arranged.

The connector part 114 is a site formed continuously from the outer circumferential part 113 and protruding outward from the outer circumference of the second substrate 12, as viewed in a plan view. At the connector part 114, the first coupling electrode 33 and the third coupling electrode 35 coupled to the electrostatic actuator 30 are arranged.

As shown in FIG. 2, the second substrate 12 is processed by etching or the like on its surface facing the first substrate 11 and thus has a mirror stand 121 facing the moving part 111, a groove part 122 provided outside of the mirror stand 121, and a base part 123 provided outside of the groove part 122.

The mirror stand 121 is a site where the second mirror 22 facing the first mirror 21 via the first gap G1 is provided. The surface of the mirror stand 121 facing the first substrate 11 is formed as a planar surface parallel to the first surface 11A of the moving part 111.

The groove part 122 is a groove facing the first electrode 31 via the second gap G2. In this embodiment, the mirror stand 121 and the groove part 122 are provided in such a way that the dimension of the second gap G2 is larger than the dimension of the first gap G1. However, the mirror stand 121 and the groove part 122 may be provided in such a way that the dimension of the first gap G1 is larger than the dimension of the second gap G2.

In this embodiment, the mirror stand 121 and the groove part 122 are formed by isotropic etching. Therefore, the groove part 122 has a groove bottom part 122A parallel to the first surface 11A of the first substrate 11, a third slope part 122B, and a fourth slope part 122C.

The third slope part 122B is a site formed between the groove bottom part 122A and the base part 123 and having a thickness in the Z-direction incrementing as it goes from the groove bottom part 122A toward the base part 123.

The fourth slope part 122C is a site formed between the groove bottom part 122A and the mirror stand 121 and having a thickness in the Z-direction incrementing as it goes from the groove bottom part 122A toward the mirror stand 121.

In this embodiment, the third slope part 122B and the fourth slope part 122C have a concavely curved circular arc-like surface due to the isotropic etching.

The base part 123 is a site bonded to the first substrate 11 via the bonding part 40.

A base edge 125 (see FIG. 3), which is the boundary of the base part 123 with the groove part 122, is located facing the first slope part 112B of the diaphragm part 112. The bonding part 40 is provided at the surface of the base part 123 facing the first substrate 11, and the first substrate 11 is bonded to this surface via the bonding part 40. In this embodiment, since the base edge 125 of the base part 123 is located at the first slope part 112B of the diaphragm part 112, as described above, a part outside of the position facing the base edge 125, of the first slope part 112B in the first substrate 11, is bonded to the base part 123.

The base part 123 has a fixture part 123A protruding outward from the edge of the first substrate 11. In this embodiment, the fixture part 123A is provided on the side opposite to the connector part 114 provided at the first substrate 11. The fixture part 123A is a site fixed to a package casing, for example, when the wavelength-tunable interference filter 1 is accommodated in the package casing.

At a part of the base part 123 near the connector part 114, a wiring groove 124 formed continuously from the groove part 122 is provided. In the wiring groove 124, a second coupling electrode 34 coupled to the second electrode 32 is arranged. Also, the wiring groove 124 is provided with a protruding part 124A protruding forward the first substrate 11. The protruding part 124A may be formed simultaneously with the wiring groove 124 or may be formed by depositing a resin layer after the wiring groove 124 is formed. The second coupling electrode 34 is provided over a range from the groove part 122 to the protruding part 124A of the wiring groove 124 and is coupled to the third coupling electrode 35 provided at the first substrate 11, at the protruding part 124A. The third coupling electrode 35 is drawn out from the position facing the protruding part 124A to the connector part 114, in the first substrate 11.

In this embodiment, an example where the wiring groove 124 is provided at the base part 123 is described. However, this is not limiting. The second coupling electrode 34 may be provided over a range from the groove bottom part 122A to the base part 123, and at a part of the base part 123, the second coupling electrode 34 may be coupled to the third coupling electrode 35 provided at the first substrate 11. In this case, the thickness of the bonding part 40 may be equal to or slightly less than the total thickness of the second coupling electrode 34 and the third coupling electrode 35.

Configuration of First Mirror 21 and Second Mirror 22

The first mirror 21 is provided at the first surface 11A of the moving part 111 in the first substrate 11, as described above.

The second mirror 22 is arranged at the mirror stand 121 of the second substrate 12 in such a way as to face the first mirror 21 via the first gap G1.

The shape of the first mirror 21 and the second mirror 22 as viewed in a plan view is not particularly limited. In this embodiment, the first mirror 21 and the second mirror 22 are formed in a circular shape, as shown in FIG. 1.

The material forming the first mirror 21 and the second mirror 22 is not particularly limited and may be set according to the wavelength range of the light transmitted through the wavelength-tunable interference filter 1. For example, when the wavelength of the light transmitted through the wavelength-tunable interference filter 1 (target wavelength) is changed over a broad wavelength range from a visible range to a near-infrared range, a mirror material having a high reflection characteristic to this wavelength range is used for the first mirror 21 and the second mirror 22. In this case, for example, a metal film of Ag or the like, or an alloy film of an Ag alloy or the like is preferably used. Meanwhile, when the wavelength of the light transmitted through the wavelength-tunable interference filter 1 (target wavelength) is changed over a narrow range, a dielectric multilayer film formed of a high refractive index layer and a low refractive index layer stacked over each other is preferably used for the first mirror 21 and the second mirror 22. In this case, high-resolution light with a narrow half-value width can be emitted from the wavelength-tunable interference filter 1.

Configuration of First Electrode 31

Figure 3:
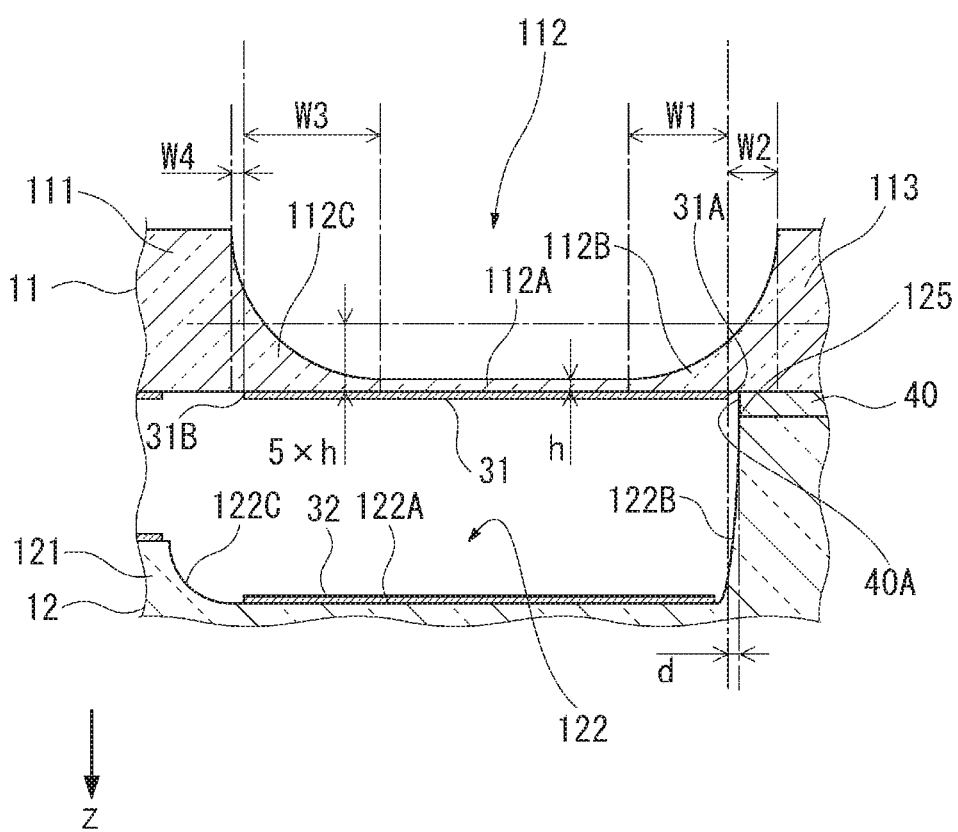
FIG. 3 is an enlarged cross-sectional view of the vicinities of a diaphragm part in the first embodiment.

FIG. 3 is an enlarged cross-sectional view of the diaphragm part 112 in the first substrate 11.

The first electrode 31 is provided at the first surface 11A of the diaphragm part 112 in the first substrate 11. Specifically, an edge of the first electrode 31 on the bonding part 40 side (outer edge 31A) is located at the first slope part 112B, and an edge of the first electrode 31 on the first mirror 21 side (inner edge 31B) is located at the second slope part 112C, as viewed in the Z-direction. That is, the outer edge 31A of the first electrode 31 is located at a position that is apart by a dimension W1 from an edge of the planar part 112A on the outer circumferential part 113 side and by a dimension W2 from an edge of the outer circumferential part 113, between the planar part 112A and the outer circumferential part 113, as viewed in a plan view taken from the Z-direction. The inner edge 31B of the first electrode 31 is located at a position that is apart by a dimension W3 from an edge of the planar part 112A on the moving part 111 side and by a dimension W4 from an edge of the moving part 111, between the planar part 112A and the moving part 111.

The first coupling electrode 33 is coupled to the first electrode 31, as described above. The first coupling electrode 33 extends over a range from the diaphragm part 112 to the connector part 114.

The positions of the outer edge 31A and the inner edge 31B of the first electrode 31, and the positional relationship between the first electrode 31 and the bonding part 40 will be described in detail later.

Configuration of Second Electrode 32

The second electrode 32 is provided at the groove bottom part 122A of the groove part 122 in the second substrate 12. Therefore, in the state where the moving part 111 is not displaced, the second electrode 32 is parallel to the first electrode 31 and the dimension of the second gap G2 is maintained to a predetermined value.

The second substrate 12 has a large thickness in relation to the planar part 112A of the diaphragm part 112 and is therefore subject to only a very small influence of the membrane stress of the second electrode 32.

The second coupling electrode 34 is coupled to the second electrode 32, as described above. The second coupling electrode 34 passes through the wiring groove 124 from the groove part 122 and extends to the protruding part 124A. At the protruding part 124A, the second coupling electrode 34 is coupled to the third coupling electrode 35 provided at the first substrate 11.

Configuration of Bonding Part 40

The bonding part 40 is formed of a bonding film bonding the first substrate 11 and the second substrate 12 together. For such a bonding film, for example, a plasma polymer film containing siloxane as a principal component, or the like, can be used. Also, an adhesive such as an epoxy resin may be used.

The bonding part 40 is provided at the surface of the base part 123 facing the first substrate 11 and bonds the first substrate 11 and the second substrate 12 together, as described above.

In this embodiment, the base edge 125 of the base part 123 is located facing the first slope part 112B. Therefore, an edge of the bonding part 40 (bonding edge 40A), too, is located at the first slope part 112B. That is, the bonding part 40 bonds an area ranging from a part of the first slope part 112B in the first substrate 11 to the outer circumferential part 113, to the base part 123.

Arrangement Position of First Electrode 31 and Positional Relationship Between First Electrode 31 and Bonding Part 40

Figure 4:
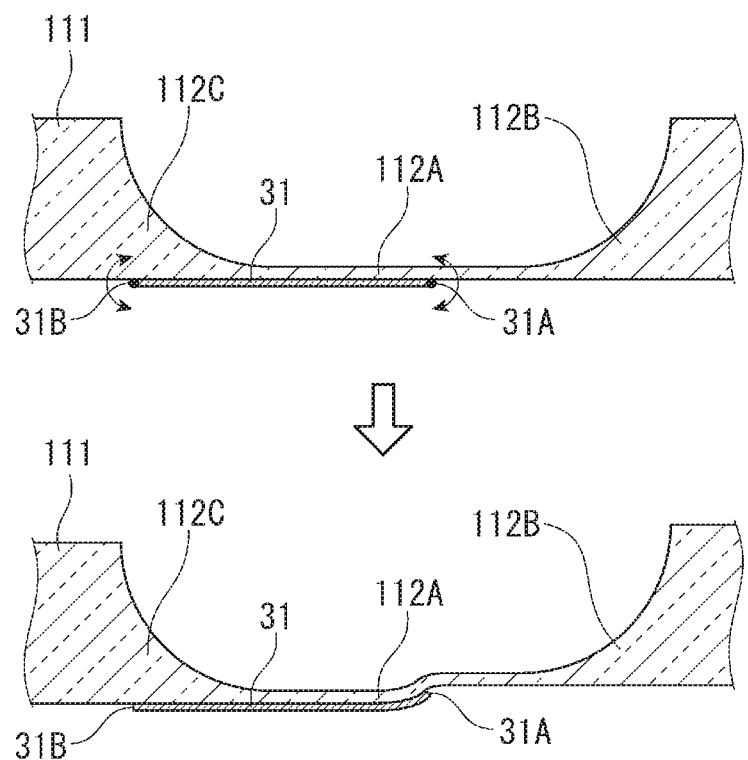
FIG. 4 illustrates a deformation of a planar part due to the action of a moment.

FIG. 4 illustrates a deformation of the planar part 112A due to the action of a moment and shows a wavelength-tunable interference filter having a configuration in which the outer edge 31A of the first electrode 31 is located at the planar part 112A, as a comparative example 1.

When the first electrode 31 is provided at the diaphragm part 112, a moment acts on the diaphragm part 112 due to the membrane stress of the first electrode 31. This moment particularly concentrates at the edge of the first electrode 31. The moment is equal to a thermal deformation generated due to the difference in coefficient of thermal expansion between the first electrode 31 and the first substrate 11. That is, the moment increases as the amount of temperature change increases.

In the comparative example 1 shown in FIG. 4, the outer edge 31A of the first electrode 31 is located at the planar part 112A having a small thickness. In this case, the planar part 112A is deformed as shown at the bottom in FIG. 4 due to the moment acting mainly on the outer edge 31A. When such a deformation occurs, the dimension of the first gap G1 changes and the parallel between the first mirror 21 and the second mirror 22 cannot be maintained.

Meanwhile, in this embodiment, the outer edge 31A of the first electrode 31 is located at the first slope part 112B, and the inner edge 31B is located at the second slope part 112C, as described above. That is, in the diaphragm part 112, the position where the moment due to the membrane stress of the first electrode 31 concentrates is the first slope part 112B or the second slope part 112C having a larger thickness than the planar part 112A. Therefore, the deformation of the diaphragm part 112 is restrained, compared with the case where the outer edge 31A or the inner edge 31B is located at the planar part 112A.

In this embodiment, the outer edge 31A of the first electrode 31 and the bonding edge 40A of the bonding part 40 are located at the first slope part 112B. In such a configuration, the moment acting on the outer edge 31A due to the membrane stress of the first electrode 31 is cancelled by the action-reaction at the bonding part 40. Therefore, the deformation of the bonding part 40 is restrained.

Figure 5:
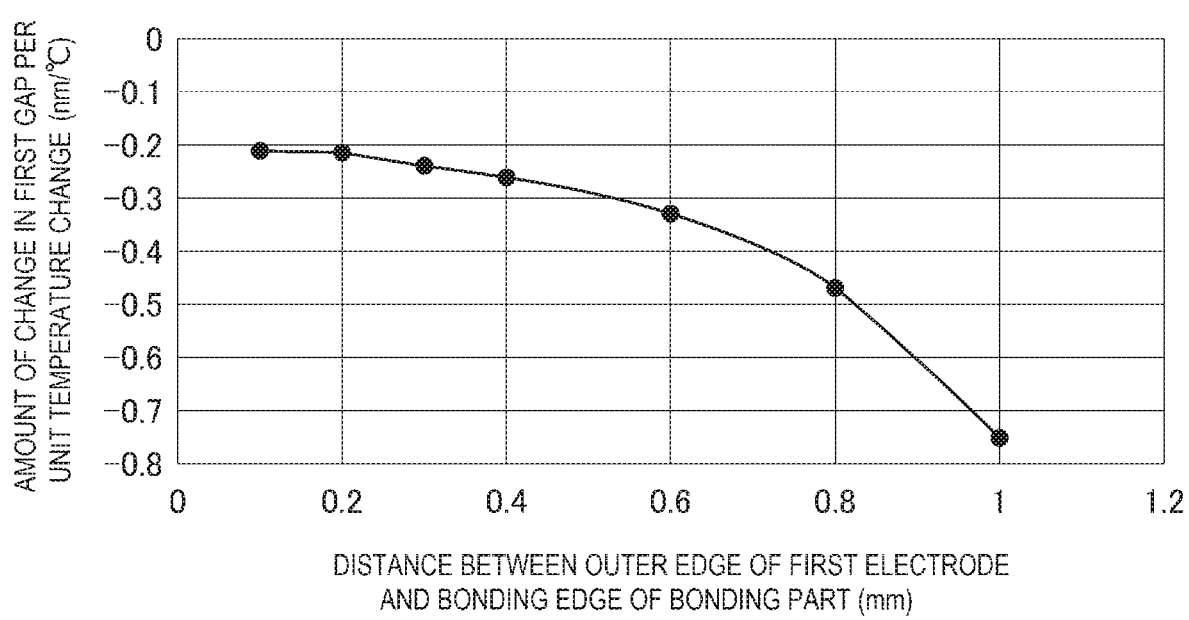
FIG. 5 shows the relationship between the distance between an outer edge and a bonding edge, and the temperature characteristic, in the first embodiment.

FIG. 5 shows the relationship between the distance d between the outer edge 31A and the bonding edge 40A, and the temperature characteristic.

As shown in FIG. 5, when the distance d between the outer edge 31A and the bonding edge 40A is 0.2 mm or shorter, the amount of change in the first gap G1 in relation to temperature change is substantially a constant value and its magnitude is small enough to have no influence on measurement accuracy. It is shown that the moment due to the membrane stress of the first electrode 31 is offset by the action-reaction at the bonding part 40.

However, when the distance d between the outer edge 31A and the bonding edge 40A exceeds 0.2 mm, the amount of change in the first gap G1 in relation to temperature change increases gradually. It means that the offsetting effect at the bonding part 40 on the moment due to the membrane stress of the first electrode 31 decreases as the distance d between the first electrode 31 and the bonding part 40 increases to 0.2 mm or longer.

Therefore, the distance d between the outer edge 31A and the bonding edge 40A is preferably set to 0.2 mm or shorter.

Meanwhile, at the second slope part 112C, where the inner edge 31B is provided, a bonding part offsetting a moment like the bonding part 40 is not provided. Therefore, the position of the inner edge 31B in relation to the second slope part 112C is set in such a way that even when a moment acts at the inner edge 31B, the second slope part 112C is not deformed by the moment.

Figure 6:
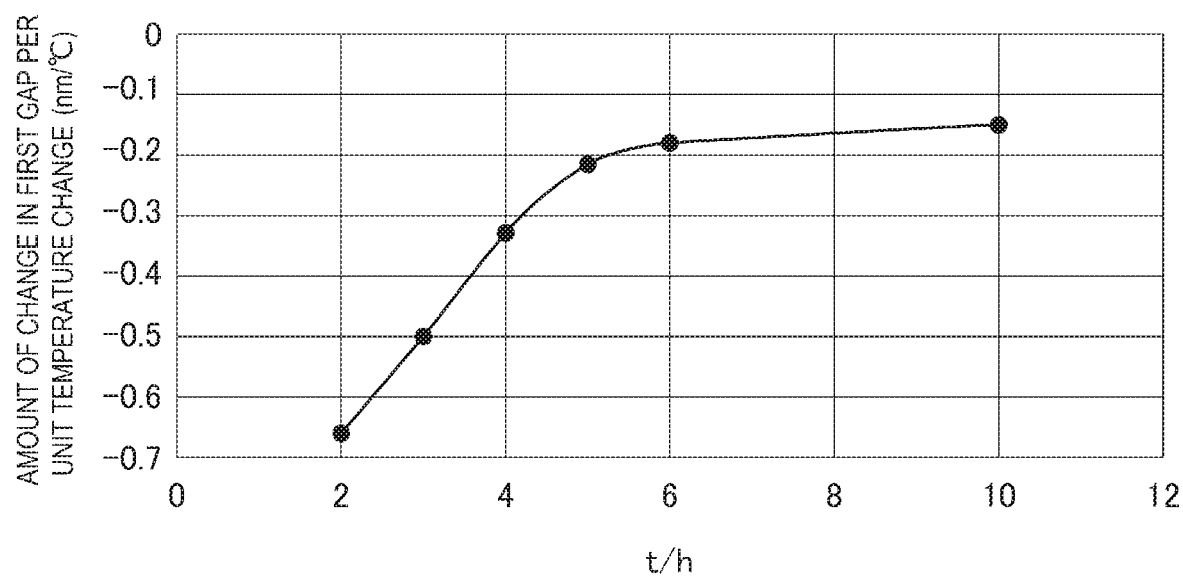
FIG. 6 shows the relationship between the thickness of the diaphragm part at an inner edge of a first electrode and the temperature characteristic in the first embodiment.

FIG. 6 shows the relationship between the thickness of the diaphragm part 112 at the position of an edge (inner edge 31B) of the first electrode 31 and the temperature characteristic.

In FIG. 6, t represents the thickness of the diaphragm part 112 in the Z-direction at the inner edge 31B of the first electrode 31, and h represents the thickness of the planar part 112A in the Z-direction. As shown in FIG. 6, when $t/h<5$, the amount of change in the first gap G1 in relation to temperature change increases. In contrast, when $t/h \geq 5$, the amount of change in the first gap G1 in relation to temperature change is substantially a constant value and its magnitude is small enough to have no influence on measurement accuracy.

Therefore, the inner edge 31B is preferably provided at the position where the thickness t of the second slope part 112C in the Z-direction is t≥5×h. In this embodiment, the diaphragm part 112 is formed by isotropic etching and the first slope part 112B and the second slope part 112C have an arc-shape surface.

In this embodiment, since the outer edge 31A of the first electrode 31 is provided at the position at the distance of 0.2 mm or shorter from the bonding part 40, the moment acting at the outer edge 31A can be offset by the action-reaction at the bonding part 40, as described above. Meanwhile, the outer edge 31A may be arranged at the position where the thickness t of the first slope part 112B in the Z-direction is t≥5×h. In this case, the deformation of the diaphragm part 112 can be restrained further.

Figure 7:
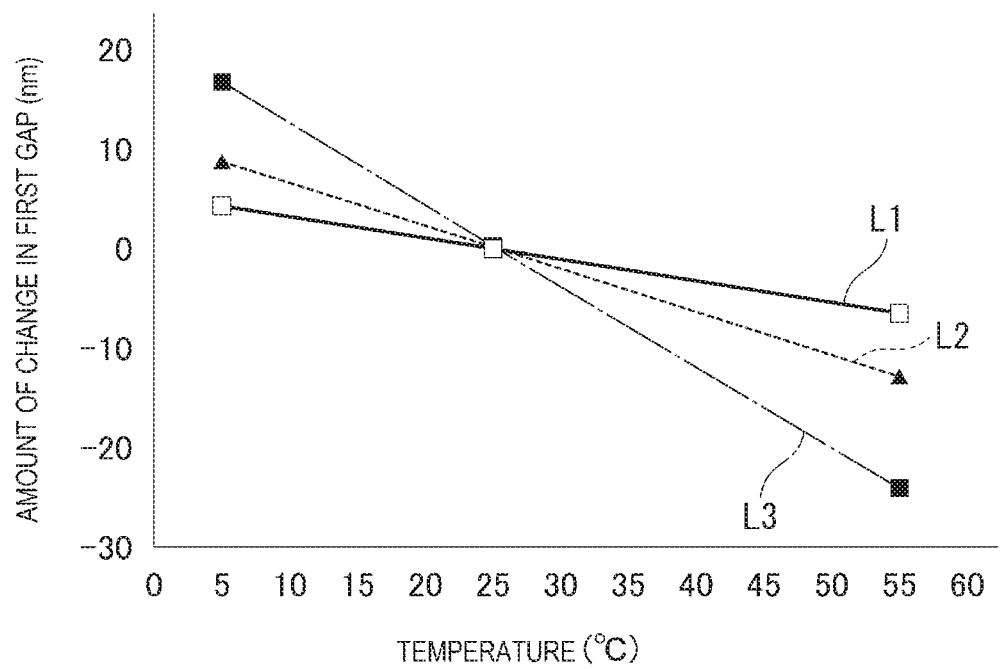
FIG. 7 shows a comparison between the temperature characteristic of the wavelength-tunable interference filter according to the first embodiment and the temperature characteristics of comparative examples 1 and 2.

FIG. 7 shows the temperature characteristic of the wavelength-tunable interference filter according to this embodiment and the temperature characteristics according to comparative examples 1 and 2. In FIG. 7, a line L1 represents the temperature characteristic according to this embodiment. A line L2 represents the temperature characteristic according to the comparative example 1. A line L3 represents the temperature characteristic according to the comparative example 2.

The comparative example 1 is a wavelength-tunable interference filter in which the inner edge 31B of the first electrode 31 is located at the second slope part 112C and in which the outer edge 31A is located at the planar part 112A, as shown in FIG. 4. The comparative example 2 is a wavelength-tunable interference filter in which both of the outer edge 31A and the inner edge 31B of the first electrode 31 are provided at the planar part 112A.

As shown in FIG. 7, it can be confirmed that, in the wavelength-tunable interference filter 1 according to this embodiment, the amount of change in the first gap G1 in relation to temperature change is smaller than in the comparative examples 1 and 2.

Advantageous Effects of this Embodiment

The wavelength-tunable interference filter 1 according to the embodiment has the first substrate 11, the second substrate 12 facing the first substrate 11, the first mirror 21 provided at the first substrate 11, the second mirror 22 provided at the second substrate 12 and facing the first mirror 21 via the first gap G1, the first electrode 31 provided at the first substrate 11, the second electrode 32 provided at the second substrate 12 and facing the first electrode 31 via the second gap G2, and the bonding part 40 bonding the first substrate 11 and the second substrate 12 together. The first substrate 11, as viewed in a plan view, includes the moving part 111, where the first mirror 21 is arranged, the diaphragm part 112 surrounding the moving part 111 and holding the moving part 111 in such a way that the moving part 111 is movable in the Z-direction, and the outer circumferential part 113 provided outside of the diaphragm part 112 and having a greater thickness than the diaphragm part 112. The diaphragm part 112 includes the planar part 112A having a uniform thickness and the first slope part 112B arranged between the planar part 112A and the outer circumferential part 113 and having a thickness incrementing as it goes from the planar part 112A toward the outer circumferential part 113, as viewed in a cross-sectional view sliced along a plane parallel to the Z-direction. The first electrode 31 is provided at least over a range from the planar part 112A to the first slope part 112B, of the first surface 11A of the first substrate 11 facing the second substrate 12. The outer edge 31A of the first electrode 31, which is the edge opposite to the first mirror 21, is located at the first slope part 112B. The bonding part 40 is provided over a range from a position overlapping the first slope part 112B to the outer circumferential part 113.

The wavelength-tunable interference filter 1 of such a configuration can be reduced in planar size.

That is, in order to reduce the size of the wavelength-tunable interference filter 1, the planar size of the first substrate 11 and the second substrate 12 needs to be reduced and the bonding area for bonding the first substrate 11 and the second substrate 12 together via the bonding part 40 is reduced accordingly. In this case, to maintain sufficient bonding strength between the first substrate 11 and the second substrate 12, a predetermined area of bonding or greater needs to be secured between the first substrate 11 and the second substrate 12 bonded together via the bonding part 40. However, for example, when the first electrode 31 is formed over a range from the moving part 111 to the diaphragm part 112 and the outer circumferential part 113 in the first substrate 11, the bonding part 40 needs to be provided further outside of the first electrode 31 provided at the outer circumferential part 113. Therefore, there is a limit to the reduction in size of the first substrate 11 and the second substrate 12 while securing a predetermined area of bonding or greater. If priority is given to the reduction in size and a small area of bonding is employed, the bonding strength between the first substrate 11 and the second substrate 12 is insufficient, resulting in lower reliability.

However, in this embodiment, the outer edge 31A of the first electrode 31 is located at the first slope part 112B, and the bonding edge 40A of the bonding part 40, too, is located at the first slope part 112B. In this case, compared with the configuration where the first electrode 31 covers a range from the moving part 111 to the diaphragm part 112 and the outer circumferential part 113 in the first substrate 11 as described above, the position of the bonding part 40 can be moved up to the first slope part 112B, while the area of the first electrode 31 remains small and a predetermined area of bonding or greater is maintained. Therefore, the wavelength-tunable interference filter 1 can be reduced in size without lowering the reliability of the wavelength-tunable interference filter 1.

Meanwhile, when the position of the outer edge 31A of the first electrode 31 is at the planar part 112A in order to reduce the size of the wavelength-tunable interference filter 1, a moment acts on the planar part 112A due to the membrane stress of the first electrode 31 and therefore the shape of the planar part 112A is deformed. In this case, there is also a risk of change in the dimension of the first gap G1, causing the first mirror 21 to tilt in relation to the second mirror 22. Also, the amount of change in the first gap per unit temperature change increases.

However, in this embodiment, the outer edge 31A of the first electrode 31 is located at the first slope part 112B having a greater thickness than the planar part 112A. Therefore, the deformation of the diaphragm part 112 can be restrained.

In the wavelength-tunable interference filter 1 according to this embodiment, the distance d of the gap between the outer edge 31A of the first electrode 31 and the bonding edge 40A of the bonding part 40 is 0.2 mm or shorter.

Thus, the moment acting on the first slope part 112B due to the membrane stress of the first electrode 31 is offset by the action-reaction at the bonding part 40. Therefore, the deformation of the first slope part 112B can be restrained.

In this embodiment, the thickness of the first slope part 112B, where the outer edge 31A of the first electrode 31 is located, is five times the thickness of the planar part 112A or more.

Thus, the first slope part 112B has a sufficient thickness to resist the moment due to the membrane stress of the first electrode 31. The deformation of the first slope part 112B can be restrained further.

In this embodiment, the inner edge 31B, which is the end of the first electrode 31 on the first mirror 21 side, is located at the second slope part 112C.

Thus, even when a moment occurs at the inner edge 31B of the first electrode 31, the moment does not act on the planar part 112A and therefore the deformation of the diaphragm part 112 can be restrained.

The thickness of the second slope part 112C, where the inner edge 31B is located, is five times the thickness of the planar part 112A or more. Therefore, the second slope part 112C has a sufficient thickness to resist the moment due to the membrane stress of the first electrode 31. The deformation of the second slope part 112C can be restrained further.

Second Embodiment

A second embodiment will now be described.

In the first embodiment, a configuration example where a single first electrode 31 is provided at the first substrate 11 is employed. The second embodiment differs from the first embodiment in that two electrodes are provided at the first substrate 11.

In the description below, a component that has already been described is denoted by the same reference sign and its description is omitted or simplified.

Figure 8:
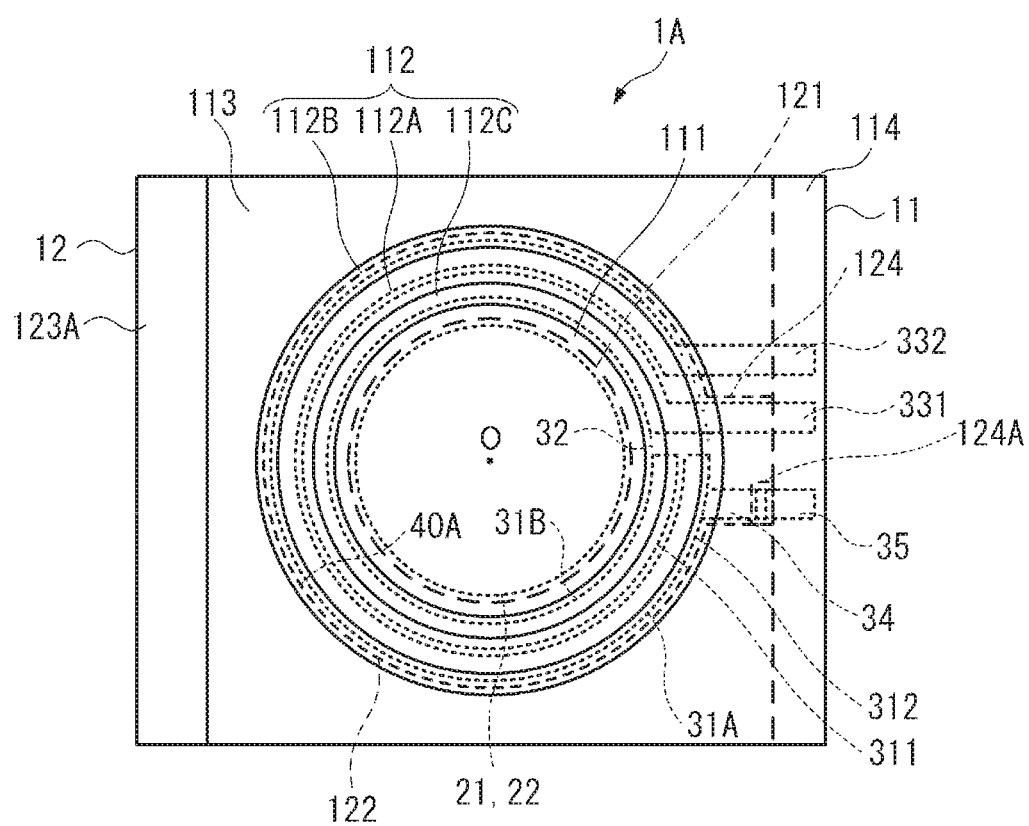
FIG. 8 is a plan view showing a schematic configuration of a wavelength-tunable interference filter according to a second embodiment.
Figure 9:
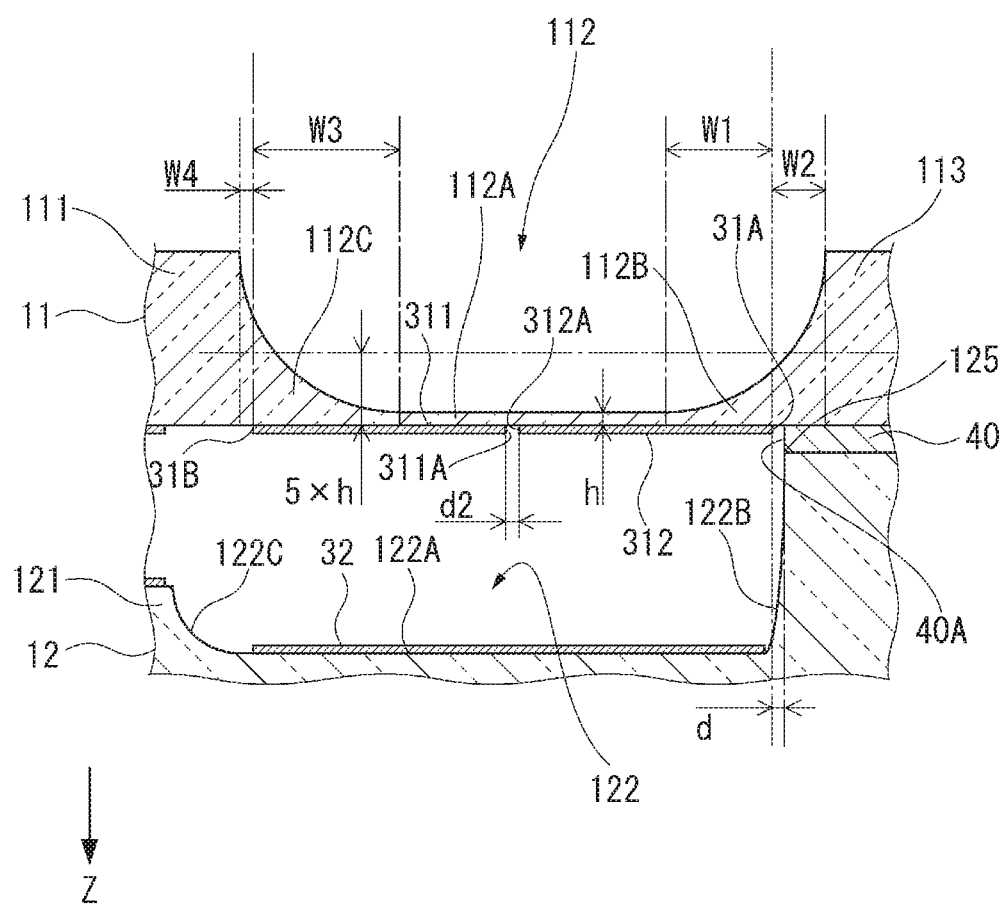
FIG. 9 is an enlarged cross-sectional view of the vicinities of a diaphragm part in the second embodiment.

FIG. 8 is a plan view showing a schematic configuration of a wavelength-tunable interference filter 1A according to the second embodiment. FIG. 9 is a cross-sectional view showing a schematic configuration of the vicinities of the diaphragm part 112 in the wavelength-tunable interference filter 1A according to the second embodiment.

In this embodiment, as shown in FIG. 8, a substantially circular ring-shaped inner electrode 311 and a substantially circular ring-shaped outer electrode 312 arranged nearer to the outer circumferential part 113 than the inner electrode 311 are provided, as the first electrode provided at the first substrate 11.

As shown in FIG. 8, an inner coupling electrode 331 extended from the diaphragm part 112 to the connector part 114 is coupled to the inner electrode 311. Also, an outer coupling electrode 332 extended from the diaphragm part 112 to the connector part 114 is coupled to the outer electrode 312.

The inner coupling electrode 331 and the outer coupling electrode 332 are electrodes that are independent of each other and have no electrical continuity to each other. Therefore, the inner electrode 311 and the outer electrode 312 are electrodes that are independent of each other.

The second electrode 32 provided at the second substrate 12 has a configuration similar to that in the first embodiment. The second electrode 32 has a greater electrode width along the direction of its diameter than the inner electrode 311 and the outer electrode 312 and is arranged facing both of the inner electrode 311 and the outer electrode 312.

In such a wavelength-tunable interference filter 1A, employing the electric potential of the second electrode 32 as a common potential and individually controlling the electric potentials of the inner electrode 311 and the outer electrode 312 can form two actuators. That is, a first electrostatic actuator formed by the inner electrode 311 and the second electrode 32, and a second electrostatic actuator formed by the outer electrode 312 and the second electrode 32 can be individually controlled.

For example, a bias voltage is applied to the first actuator to displace the moving part 111 to near a target position, and a control voltage is applied to the second actuator to fine-tune the amount of displacement of the moving part 111. The control voltage to the second actuator can be, for example, a feedback voltage based on the difference between a detected dimension of the first gap G1 and a target value.

Such an electrode configuration enables highly accurate drive control on the first gap G1 in the wavelength-tunable interference filter 1A and enables the wavelength-tunable interference filter 1A to emit light of a desired target value with high accuracy.

In this embodiment, as shown in FIG. 9, an end of the inner electrode 311 on the side near the first mirror 21 is the inner edge 31B and is provided at the second slope part 112C, as in the first embodiment. An edge of the outer electrode 312 on the side opposite to the first mirror 21 is the outer edge 31A and is provided at the first slope part 112B, as in the first embodiment.

Meanwhile, a first facing edge 311A, which is an edge of the inner electrode 311 on the outer electrode 312 side, is located at the planar part 112A. A second facing edge 312A, which is an edge of the outer electrode 312 on the inner electrode 311 side, is located at the planar part 112A. The first facing edge 311A and the second facing edge 312A face each other via the gap with a distance d2 within a plane at the planar part 112A intersecting the Z-direction.

Figure 10:
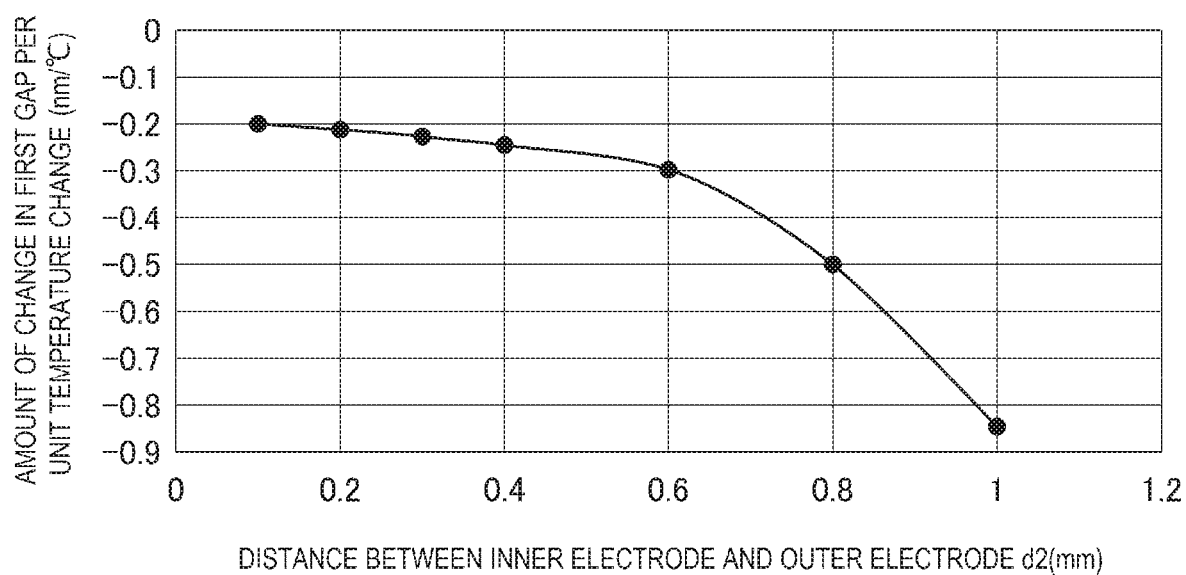
FIG. 10 shows the relationship between the distance between an inner electrode and an outer electrode, and the temperature characteristic, in the second embodiment.

FIG. 10 shows the distance d2 between the inner electrode 311 and the outer electrode 312, and the amount of change in the first gap G1 per unit temperature change.

In this embodiment, the first facing edge 311A of the inner electrode 311 and the second facing edge 312A of the outer electrode 312 are located at the planar part 112A, as described above. Therefore, moments corresponding to the membrane stresses of the inner electrode 311 and the outer electrode 312 act on the planar part 112A. The moments due to the membrane stresses are generated by the difference in coefficient of thermal expansion between the inner electrode 311 and the outer electrode 312, and the first substrate 11. The moments increase with temperature change.

These moments can offset each other better as the distance d2 between the first facing edge 311A and the second facing edge 312A becomes shorter. As shown in FIG. 10, when the distance d2 is 0.2 mm or shorter, the amount of change in the first gap G1 per unit temperature change is substantially constant and to an extent that does not affect measurement accuracy. Therefore, in this embodiment, the distance d2 between the first facing edge 311A and the second facing edge 312A is set to 0.2 mm or shorter.

Advantageous Effects of this Embodiment

In the wavelength-tunable interference filter 1A according to this embodiment, the first electrode provided at the first substrate 11 is formed of the inner electrode 311 arranged on the first mirror 21 side and the outer electrode 312 arranged on the side further away from to the first mirror 21 than the inner electrode 311.

In such a wavelength-tunable interference filter 1A, the inner electrode 311 and the second electrode 32 together can form the first actuator, and the outer electrode 312 and the second electrode 32 together can form the second actuator. The first and second actuators can be driven independently of each other.

Thus, driving the actuators, for example, by applying a bias voltage to the first actuator and applying a control voltage or the like to the second actuator, enables highly accurate control of the first gap G1 in the wavelength-tunable interference filter 1A. Thus, the wavelength-tunable interference filter 1A can emit light of a desired wavelength with high accuracy.

In this embodiment, the first facing edge 311A of the inner electrode 311 and the second facing edge 312A of the outer electrode 312 are located at the planar part 112A. The gap between the inner electrode 311 and the outer electrode 312 is set to 0.2 mm or smaller.

Therefore, the moment generated at the first facing edge 311A of the inner electrode 311 and the moment generated at the second facing edge 312A of the outer electrode 312 offset each other. This can restrain the deformation of the planar part 112A.

MODIFICATION EXAMPLES

The present disclosure is not limited to the foregoing embodiments and includes any configuration provided by a modification, improvement, suitable combination of the foregoing embodiments or the like within a range that can achieve the object of the present disclosure.

Modification Example 1

Figure 11:
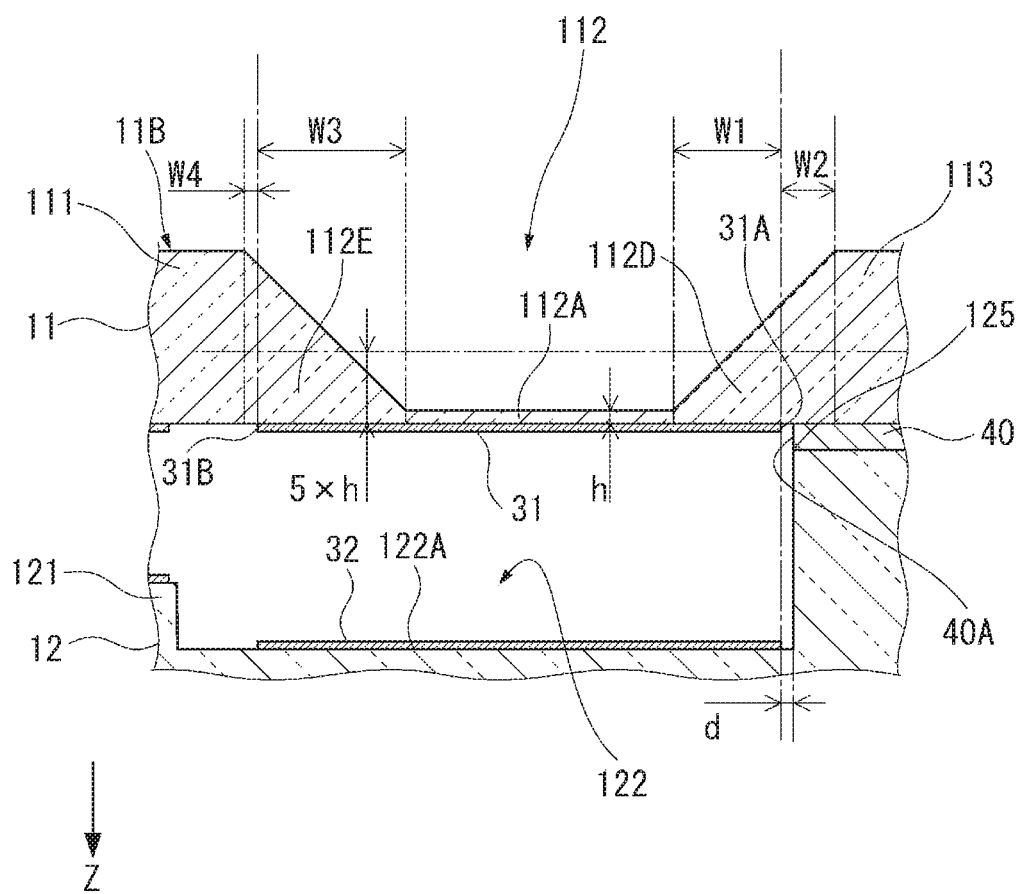
FIG. 11 shows a diaphragm part of a first substrate according to modification example 1.

In the embodiments, an example where the diaphragm part 112 is formed by isotropic etching is described. However, this is not limiting. FIG. 11 shows another shape of the diaphragm part 112 in the first substrate 11.

The diaphragm part 112 shown in FIG. 11 is formed by anisotropically etching the second surface 11B of the first substrate 11. This diaphragm part 112 has the planar part 112A, a first slope part 112D, and a second slope part 112E. The first slope part 112D has a thickness in the Z-direction incrementing as it goes from the planar part 112A toward the outer circumferential part 113, and has a sloped surface on the second surface 11B side. Similarly, the second slope part 112E has a thickness in the Z-direction incrementing as it goes from the planar part 112A toward the moving part 111, and has a sloped surface on the second surface 11B side.

The outer edge 31A of the first electrode 31 is located at the first slope part 112D, and the inner edge 31B is located at the second slope part 112E, as in the first embodiment. Thus, the wavelength-tunable interference filter 1 can be reduced in size and the deformation of the planar part 112A due to the membrane stress of the first electrode 31 can be restrained, as in the first and second embodiments.

Modification Example 2

In the embodiments, an example where the distance d of the gap between the outer edge 31A of the first electrode 31 and the bonding edge 40A of the bonding part 40 is 0.2 mm or shorter is described. However, this is not limiting. For example, the distance d may be longer than 0.2 mm. In this case, the first electrode 31 is arranged in such a way that the thickness of the first slope part 112B in the Z-direction corresponding to the position of the outer edge 31A is five times the thickness h of the planar part 112A or more. Thus, the deformation of the diaphragm part 112 due to the membrane stress of the first electrode 31 can be restrained.

Modification Example 3

In the embodiments, the first electrode 31 is arranged in such a way that the thickness t of the second slope part 112C, where the inner edge 31B of the first electrode 31 is located, is $t \geq 5 \times h$. However, the first mirror 21 may be provided over a range from the moving part 111 to the second slope part 112C in such a way that the distance between the edge of the first mirror 21 and the inner edge 31B of the first electrode 31 is 0.2 mm or shorter.

In this case, the moment due to the membrane stress of the first mirror 21 and the moment due to the membrane stress of the first electrode 31 offset each other. Thus, the moment acting on the second slope part 112C can be reduced and the deformation of the diaphragm part 112 can be restrained.

Modification Example 4

In the first and second embodiments, a thin film to reduce the membrane stress of the first electrode 31, the inner electrode 311, the outer electrode 312, and the first mirror 21 may be formed at the second surface 11B of the first substrate 11.

Modification Example 5

In the wavelength-tunable interference filters 1, 1A, the first substrate 11 and the second substrate 12 have a rectangular shape, the first mirror 21 and the second mirror 22 are circular, and the first electrode 31, the second electrode 32, the inner electrode 311, and the outer electrode 312 are substantially circular ring-shaped. However, this is not limiting.

For example, the first substrate 11 and the second substrate 12 may have a circular, elliptic, or polygonal shape. The first electrode 31, the second electrode 32, the inner electrode 311, and the outer electrode 312 may have a rectangular frame-like shape surrounding the first mirror 21 or the second mirror 22. Also, a plurality of first electrodes 31 and second electrodes 32 may be arranged at an equal spacing so as to form rotational symmetry about the filter center axis O.

The positions of the connector part 114 and the fixture part 123A are not limited to those in the embodiments, either. The connector part may be provided at the second substrate 12. The fixture part may be provided at the first substrate 11. Both of the connector part and the fixture part may be provided at one of the first substrate 11 and the second substrate 12. Also, the connector part and the fixture part may be provided at both of the first substrate 11 and the second substrate 12.

Modification Example 6

As examples of the electrode provided in the wavelength-tunable interference filters 1, 1A, the first electrode 31 and the second electrode 32 forming the electrostatic actuator 30, the inner electrode 311 forming the first electrostatic actuator, and the outer electrode 312 forming the second electrostatic actuator are described. However, this is not limiting.

An electrode for electrostatic capacitance detection to detect the dimension of the first gap G1 may be provided at both of the first substrate 11 and the second substrate 12. To detect the dimension of the first gap G1, a transparent electrode of, for example, ITO, IGO or the like, is preferably arranged at the surfaces of the first mirror 21 and the second mirror 22.

Also, an electrode for electrostatic capacitance detection to detect the second gap G2 may be additionally arranged. In this case, the electrode is formed in such a way that the edge of the electrode is located at the first slope part 112B or the second slope part 112C, as in the embodiments. Thus, the deformation of the diaphragm part 112 due to the membrane stress of the electrode can be restrained.

What is claimed is:

1. A wavelength-tunable interference filter comprising:
   a first substrate;
   a second substrate facing the first substrate;
   a first mirror provided at the first substrate;
   a second mirror provided at the second substrate and facing the first mirror via a first gap;
   a first electrode provided at the first substrate;
   a second electrode provided at the second substrate and facing the first electrode via a second gap; and
   a bonding part bonding the first substrate and the second substrate together,
   the first substrate including a moving part where the first mirror is arranged, as viewed in a plan view taken from a Z-direction heading from the first substrate toward the second substrate, a diaphragm part surrounding the moving part and holding the moving part in such a way that the moving part is movable in the Z-direction, and an outer circumferential part provided outside of the diaphragm part and having a larger thickness in the Z-direction than the diaphragm part,
   the diaphragm part including a planar part having a uniform thickness, as viewed in a cross-sectional view sliced along a plane parallel to the Z-direction, and a first slope part arranged between the planar part and the outer circumferential part and having a thickness in the Z-direction incrementing as it goes from the planar part toward the outer circumferential part,
   the first electrode being provided at least over a range from the planar part to the first slope part, of a surface of the first substrate facing the second substrate, with an outer edge of the first electrode, which is an edge opposite to the first mirror, being located at the first slope part,
   the bonding part being provided over a range from a part of the first slope part to the outer circumferential part.

2. The wavelength-tunable interference filter according to claim 1, wherein
   the first electrode is formed of an inner electrode arranged outside of the first mirror and an outer electrode arranged outside of the inner electrode.

3. The wavelength-tunable interference filter according to claim 2, wherein
   a gap between the inner electrode and the outer electrode has a distance of 0.2 mm or shorter.

4. The wavelength-tunable interference filter according to claim 1, wherein
   a gap between the outer edge and a bonding edge, which is an edge of the bonding part near the first mirror, has a distance of 0.2 mm or shorter.

5. The wavelength-tunable interference filter according to claim 1, wherein
   the thickness in the Z-direction of the first slope part, where the outer edge is located, is five times the thickness of the planar part or more.

6. The wavelength-tunable interference filter according to claim 1, wherein
   the diaphragm part further includes a second slope part provided between the planar part and the moving part and having a thickness in the Z-direction incrementing as it goes from the planar part toward the moving part, and
   an inner edge of the first electrode, which is an edge near the first mirror, is located at the second slope part.

7. The wavelength-tunable interference filter according to claim 6, wherein
   the thickness of the second slope part, where the inner edge is located, is five times the thickness of the planar part or more.

* * * * *